United States Patent
Hogan

(10) Patent No.: US 6,315,193 B1
(45) Date of Patent: Nov. 13, 2001

(54) FINANCIAL TRANSACTION CARD WITH INSTALLMENT LOAN FEATURE

(75) Inventor: Edward J. Hogan, Larchmont, NY (US)

(73) Assignee: MasterCard International Incorporated, Purchase, NY (US)

(*) Notice: Subject to any disclaimer, the term of this patent is extended or adjusted under 35 U.S.C. 154(b) by 0 days.

(21) Appl. No.: 09/144,287

(22) Filed: Aug. 31, 1998

(51) Int. Cl.⁷ ..................................................... G06F 17/60
(52) U.S. Cl. ........................... 235/379; 235/380; 902/25
(58) Field of Search .................................... 235/379, 380; 705/41, 42, 39, 35, 38; 902/25, 26, 27

(56) References Cited

U.S. PATENT DOCUMENTS 5,878,405 * 3/1999 Grant et al. ............................. 705/39

* cited by examiner

Primary Examiner—Karl D. Frech
(74) Attorney, Agent, or Firm—Baker Botts L.L.P.

(57) ABSTRACT

There is provided a financial transaction payment method and system for processing a transaction conducted using a financial transaction card. The financial transaction card has associated therewith a financial account in a financial institution and one or more transaction criteria. The financial transaction payment system includes a processing unit and an application program for execution on the processing unit. The method includes the step of determining by the application program whether a transaction activates an installment loan on the financial account based on the one or more transaction criteria.

6 Claims, 7 Drawing Sheets

FIRST BANK

EDWARD HOGAN
12 MAIN STREET
NEW YORK, NY 00000

ACCOUNT NUMBER: 5212 3456 7890 1234
STATEMENT DATE: JUNE 1, 1998
PAYMENT DUE DATE: JUNE 20, 1998
PAGE 1 OF 2

CREDIT ACTIVITY

| CREDIT LINE $5000.00 | AVAILABLE CREDIT $3800.00 | | ACTIVITY THIS MONTH $406.00 | |
|---|---|---|---|---|
| TRANSACTION DATE | REFERENCE NUMBER | TRANSACTION DESCRIPTION | LOCATION | AMOUNT |
| 5/14/98 | 2172634 | STORE | NEW YORK, NY | $206.00 |
| 5/15/98 | 6A22714 | RESTAURANT | RYE, NY | $200.00 |

| | TOTAL PURCHASES | PAY-MENTS | PREVIOUS BALANCE | NEW BAL-ANCE DUE | MINIMUM AMOUNT DUE |
|---|---|---|---|---|---|
| CREDIT | $406.00 | $206.00 | $1000.00 | $1200.00 | $150.00 |
| INSTALL-MENT LOAN | $0.00 | $300.00 | $300.00 | $300.00 | $300.00 |
| TOTALS | $406.00 | $506.00 | $1300.00 | $1500.00 | $450.00 |

FIG. 4A

FIRST BANK

EDWARD HOGAN
12 MAIN STREET
NEW YORK, NY 00000

ACCOUNT NUMBER: 5212 3456 7890 1234
STATEMENT DATE: JUNE 1, 1998
PAYMENT DUE DATE: JUNE 20, 1998
PAGE 1 OF 2

INSTALLMENT LOANS

CREDIT LINE $10000.00　　AVAILABLE CREDIT $4500.00　　CREDIT UTILIZED $5500.00

| TRANS-ACTION DATE | TRANSAC-TION DESCRIPTION | LOAN AMOUNT | NUMBER OF INSTALL-MENTS | CURRENT INSTALLMENT PAYMENT NUMBER | CURRENT INSTALLMENT PAYMENT DUE | BAL-ANCE DUE |
|---|---|---|---|---|---|---|
| 10/2/96 | CASH | $2000.00 | 24 | 20 | $100.00 | $400.00 |
| 1/11/98 | ABC TOURS | $4000.00 | 36 | 5 | $150.00 | $4650.00 |
| 3/17/98 | MART | $500.00 | 12 | 3 | $50.00 | $450.00 |
| | TOTALS | $6500.00 | | | $300.00 | $5500.00 |

INSTALLMENT LOAN TERMS

| LOAN AMOUNT | | | NUMBER OF INSTALLMENTS |
|---|---|---|---|
| $1 | - | $999 | 12 |
| $1000 | - | $2499 | 24 |
| $2500 | - | $4999 | 36 |
| $5000 | - | $9999 | 48 |

FIG. 4B

FINANCIAL TRANSACTION CARD WITH INSTALLMENT LOAN FEATURE

BACKGROUND OF INVENTION

The present invention relates to a financial transaction payment method and system utilizing financial transaction cards, such as credit cards and debit cards, and to a financial transaction payment method and system involving installment loans, which are loans in which the loan amount and loan interest are repaid in a predetermined number of periodic payments, usually monthly.

Financial transaction cards have made great gains in the United States as a means to attract financial accounts to financial institutions and, in the case of credit cards, as a medium to create small loans and generate interest income for financial institutions. Nonetheless, the financial transaction card industry is subject to certain well-known problems.

Taking the credit card industry, for example, it is well-known that the financial institutions issuing credit cards must constantly renew their card account base each year. Typically, in fact, a financial institution must increase its credit card account base by 10% to 12% each year to offset voluntary and involuntary card account transfers and closures. To realize these needed gains, financial institutions are constantly mailing credit card offers to consumers. Such offers usually contain incentives such as no annual fees, delayed payments, and favorable annual percentage rates (APR) to attract new cardholders.

Another problem in the credit card industry is related to the unprofitability of carrying certain types of cardholders. The credit card account base of a financial institution is typically characterized as having two types of cardholders: pay-in-full cardholders (those cardholders that pay their statements in full in each billing cycle) and roll-over cardholders (those cardholders that do not pay their statements in full in each billing cycle, but roll over some of their payments to subsequent billing cycles). On average, the typical account base of a financial institution consists of 25% of pay-in-full cardholders and 75% of roll-over cardholders. Currently, the profitability of the account base of a financial institution is almost entirely attributable to the revenue generated from the interest income from the roll-over cardholders. Nonetheless, the pay-in-full cardholders generate about 50% of the sales activity of the account base. Because of the cost of funds and the lack of receipt of annual fees, the pay-in-full cardholders are a great expense for financial institutions.

Accordingly, it would be desirable to have a financial transaction card method and system that contains a financial feature that is able to attract new cardholders and that can generate added revenue for financial institutions, both from roll-over cardholders and pay-in-full cardholders.

SUMMARY OF THE INVENTION

The present invention solves the aforementioned problems by providing a system and method for activating automatically an installment loan based on certain transaction criteria associated with transactions involving a financial transaction card.

Currently, the installment lending market is many times larger than that of the financial transaction card market. Consumers typically use installment loans for paying for such items as travel and large home appliances. Advantageously, by providing a cardholder with the ability to obtain an installment loan using a financial transaction card, a financial institution is able to leverage an existing financial account (the financial transaction card account) to provide another service to the cardholder. In other words, by providing the convenience of obtaining an installment loan through a financial transaction card account, a cardholder is less likely to obtain such a loan from another financial institution.

Because of the size of the installment lending market, it is expected that significant revenue will be generated for a financial institution providing installment loans through financial transaction cards. Moreover, the convenience of obtaining an installment loan through a financial transaction card may also be used as a strong incentive to lure new cardholders to a financial institution and, thus, increase the financial institution's financial transaction card account base.

In accordance with a preferred embodiment of the present invention, there is provided a method of conducting a transaction using a financial transaction card in a financial transaction payment system. The financial transaction payment system includes a processing unit and an application program executing on the processing unit. The financial transaction card has associated therewith a financial account in a financial institution and one or more transaction criteria. The method includes the step of determining by the application program whether the transaction activates an installment loan on the financial account based on the one or more transaction criteria.

Preferably, the financial account has an associated available installment loan credit amount. The method of the present invention then further includes the step of determining by the application program whether the amount of the transaction is greater than the available installment loan credit amount. In addition, the method may also include the step of decreasing by the application program the available installment loan credit amount by the amount of the transaction if the amount of the transaction is less than or equal to the available installment loan credit amount.

It is also preferred that the financial transaction card has associated therewith a primary financial payment function other than activating an installment loan. For example, the primary financial payment function may be a credit payment function or a debit payment function. In such a case, the method of the present invention also includes the step of processing the transaction by the application program in accordance with the primary financial payment function if the transaction does not activate an installment loan on the financial account.

In accordance with another preferred embodiment t of the present invention, a method of authorizing a transaction between a consumer and a merchant is also provided. The consumer has a financial transaction card issued by an issuing financial institution, the financial transaction card having associated therewith a financial account with the financial institution, one or more transaction criteria, a primary financial payment processing procedure, and an installment loan processing procedure. The method includes the step of processing an authorization request by the application program using the primary financial payment processing, procedure or the installment loan processing procedure depending on whether or not the transaction criteria are met.

Preferably, the method further includes tie step of requesting authorization by the merchant from a financial transaction card processing entity the at is in electronic communication with the issuing financial institution before the processing step. In addition, the method preferably further includes the steps of capturing by the merchant the transaction if an authorization is received in response to the authorization request, and transmitting by the merchant the captured transaction to the financial transaction card processing entity. In addition, the method may also include the step of settling the transaction by the financial transaction card processing entity with the merchant and the financial institution.

In accordance with yet another preferred embodiment of the present invention, there is also provided a method of setting up an account associated with a financial transaction card of a consumer, which may be used to activate one or more installment loans for the payment of one or more transactions. The method is used in connection with a financial transaction payment system that includes a processing unit, an application program for execution on the processing unit, and a memory unit coupled to the processing unit. The method includes the steps of storing by the application program in the memory unit a credit limit for the one or more installment loans that may be activated with the financial transaction card, and storing by the application program in the memory unit one or more activation criteria for the one or more installment loans that may be activated with the financial transaction card. Thorn activation criteria may include the type of a transaction, the amount of a transaction, and the merchant classification code associated with a merchant involved in a transaction.

Preferably the method further includes the step of storing by the application program in the memory unit payment terms for the one or more installment loans that may be activated with the financial transaction card. The method may further include the step of storing by the application program in the memory unit an available credit amount for the one or more installment loans that may be activated with the financial transaction card.

In accordance with yet another preferred embodiment of the present invention, there is provided a method of preparing a statement for transactions conducted using a financial transaction card and stored in the memory unit of a financial transaction processing system, as described above. Each transaction is associated with either a primary financial payment procedure or an installment loan payment procedure. The method includes the steps of: (a) determining by the application program the totals of the transactions associated with the primary financial payment procedure; (b) determining by the application program the totals of the transactions associated with the installment loan payment procedure; and (c) printing by the application program the totals of the transactions associated with the primary financial payment procedure and the totals of the transactions associated with the installment loan payment procedure on the statement.

In accordance with yet another preferred embodiment of the present invention, there is provided a method of processing a payment for a financial transaction card account, the financial transaction card account having an associated installment loan balance and an associated credit balance. The method includes the steps of determining by the application program whether the payment is less than the installment loan balance, and processing by the application program a cash advance against the credit balance equal to the difference between the payment and the installment loan balance, if the payment is less than the installment loan balance.

In accordance with yet another preferred embodiment of the present invention, there is provided a financial transaction payment system for processing a transaction conducted using a financial transaction card. The financial transaction card has associated therewith a financial account with a financial institution and one or more transaction criteria. The financial transaction payment system includes a processing unit; an application program for execution on the processing unit; and means for determining by the application program whether the transaction activates an installment loan on the financial account based on the one or more transaction criteria.

BRIEF DESCRIPTION OF THE DRAWINGS

FIGS. 4A and 4B illustrate a statement produced by a financial transaction card system with an installment loan feature in accordance with a preferred embodiment of the present invention.

DETAILED DESCRIPTION OF THE INVENTION

Figure 1A:
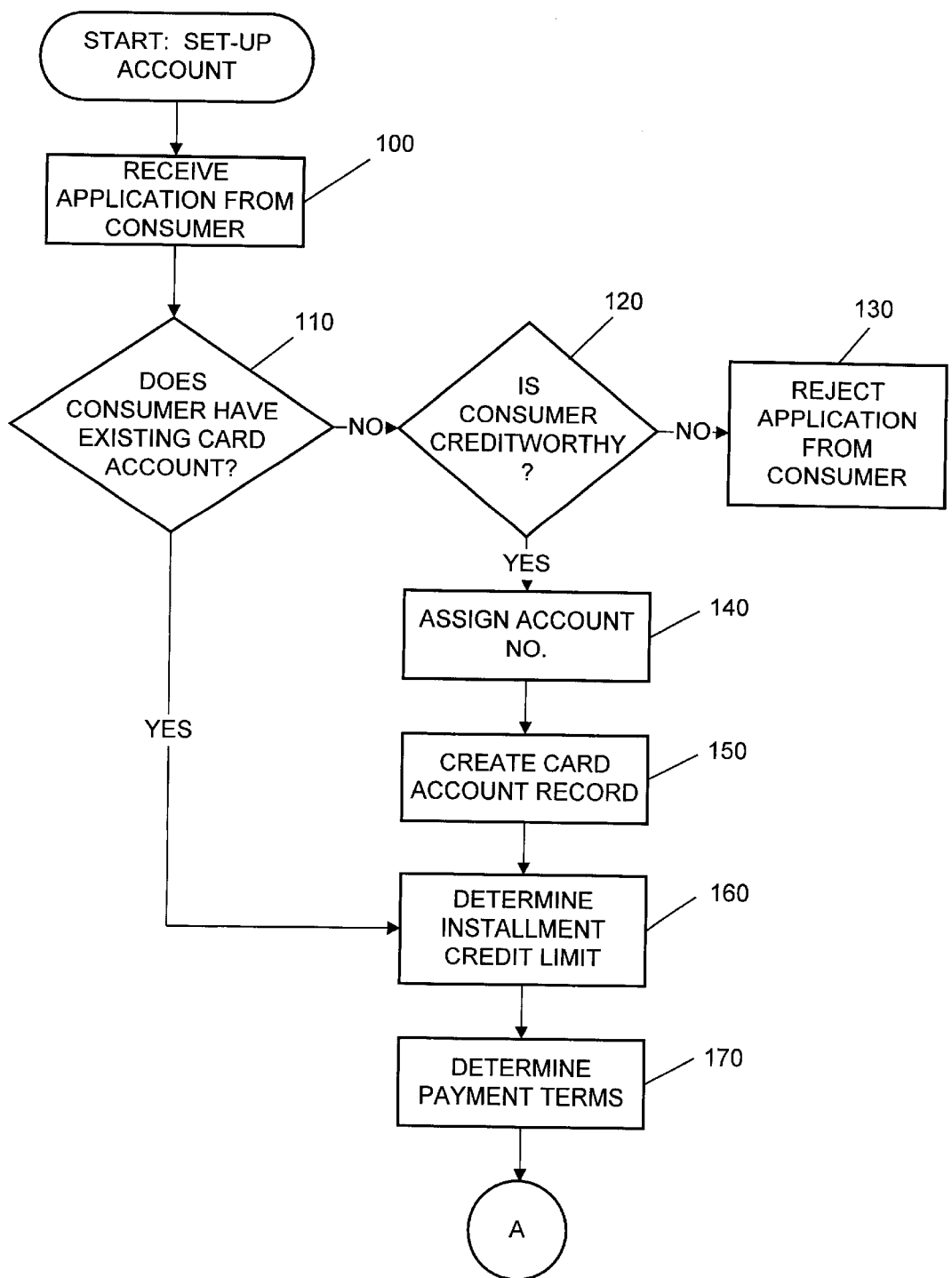
FIGS. 1A and 1B are flowcharts illustrating the steps for setting up a financial transaction card account with an installment loan feature according to a preferred embodiment of the present invention.

The present invention is related to a financial transaction card payment system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®.

In a typical financial payment system, a financial institution called the "issuer" issues a financial transaction card, such as a credit card, to a consumer, who uses the financial transaction card to tender payment for a purchase from a merchant. To accept payment with the financial transaction card, the merchant must normally establish an account with a financial institution that is part of the financial payment system. This financial institution is usually called the "merchant bank" or the "acquiring bank." When a consumer tenders payment for a purchase with a financial transaction card, the merchant requests authorization from the merchant bank for the amount of the purchase. The request may be performed over the telephone, but is usually performed through the use of a point-of-sale terminal, which reads the consumer's account information from the magnetic stripe on the financial transaction card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange, the computers of the merchant bank or the merchant processor will communicate with the computers of the issuer to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group.

Figure 1B:
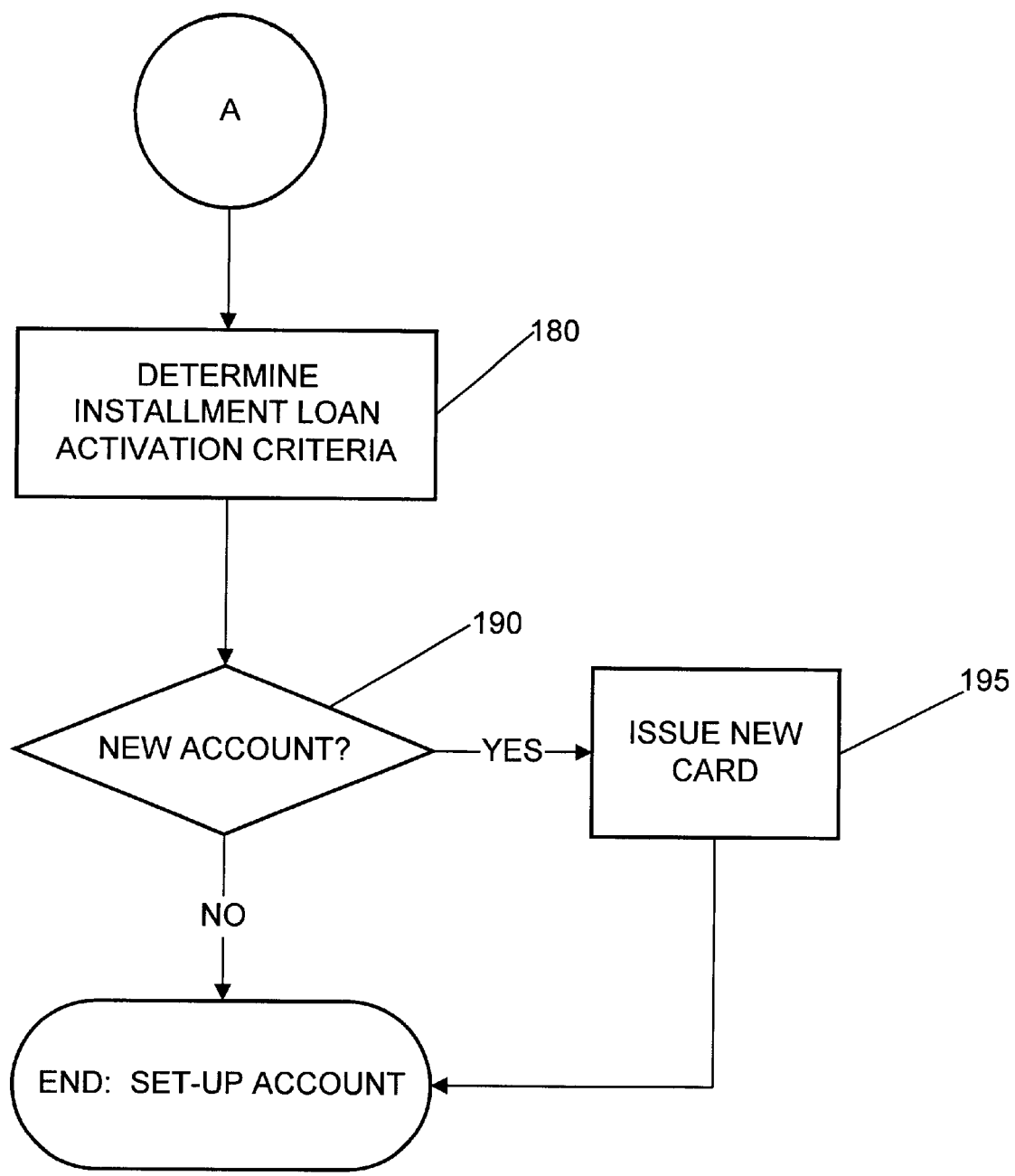

FIGS. 1A and 1B are flowcharts illustrating the steps for setting up a financial transaction card account with an installment loan feature according to a preferred embodiment of the present invention. In step 100, a financial institution receives an application from a consumer desiring to obtain a financial transaction card having an installment loan feature from the financial institution. In the preferred embodiment of the figures, the financial transaction card is a credit card. The present invention is not limited to such an embodiment, however, but encompasses any other financial transaction card, such as a debit card.

In step 110, the financial institution determines, by reviewing the application and its cardholder database, whether the consumer has an existing credit card account. If the consumer does not have an existing credit card account, in step 120, the financial institution determines, by well-established financial industry guidelines, whether the consumer is creditworthy. If the consumer is not creditworthy, the application is rejected in step 130. If the consumer is determined to be creditworthy, in steps 140 and 150, a credit card account number is assigned to the consumer and a card account record is created in the financial institution's database. The card account record includes such information as the consumer's credit card account number, name, address, and payment balances.

In step 160, for both new and existing card accounts, the financial institution determines the installment loan credit limit for the cardholder. This credit limit may also be determined by well-established industry guidelines based on the cardholder's credit history. In step 170, the payment terms for installment loans are determined. As illustrated in FIG. 4B, the payment terms may include a predetermined number of installment payments based on a range of loan amounts. In addition, the payment terms may include predetermined interest rates based on a range of loan amounts (not illustrated). The payment terms may be established generally by the financial institution for all cardholders or may be established by the financial institution on a cardholder-by-cardholder basis depending on a cardholder's credit history. The financial institution may also allow the cardholder to select certain payment term options on the application form (such as the number of installment payments for a loan range).

Referring to FIG. 1B, in step 180, the financial institution determines the installment loan criteria for the credit card account. This criteria triggers the installment loan processing of a purchase made with the credit card, instead of the usual credit processing of the purchase. Such criteria may include, for example, the type of a transaction (e.g., cash advance), the dollar amount of a transaction, or the merchant classification code of the merchant involved in a transaction. These criteria may be specified by the financial institution or may alternatively be selected by cardholders. In addition, there may be more than one criterion associated with a credit card account that triggers an installment loan. A default criterion, such as "No Installment Loans," may also be established for those cardholders that do not wish to take advantage of the installment loan features available with their cards.

Preferably, the determinations made in steps 160, 170, and 180 are stored in the cardholder's account record. In steps 190 and 195, if a new credit card account has been created, a new credit card is issued to the consumer.

Figure 2:
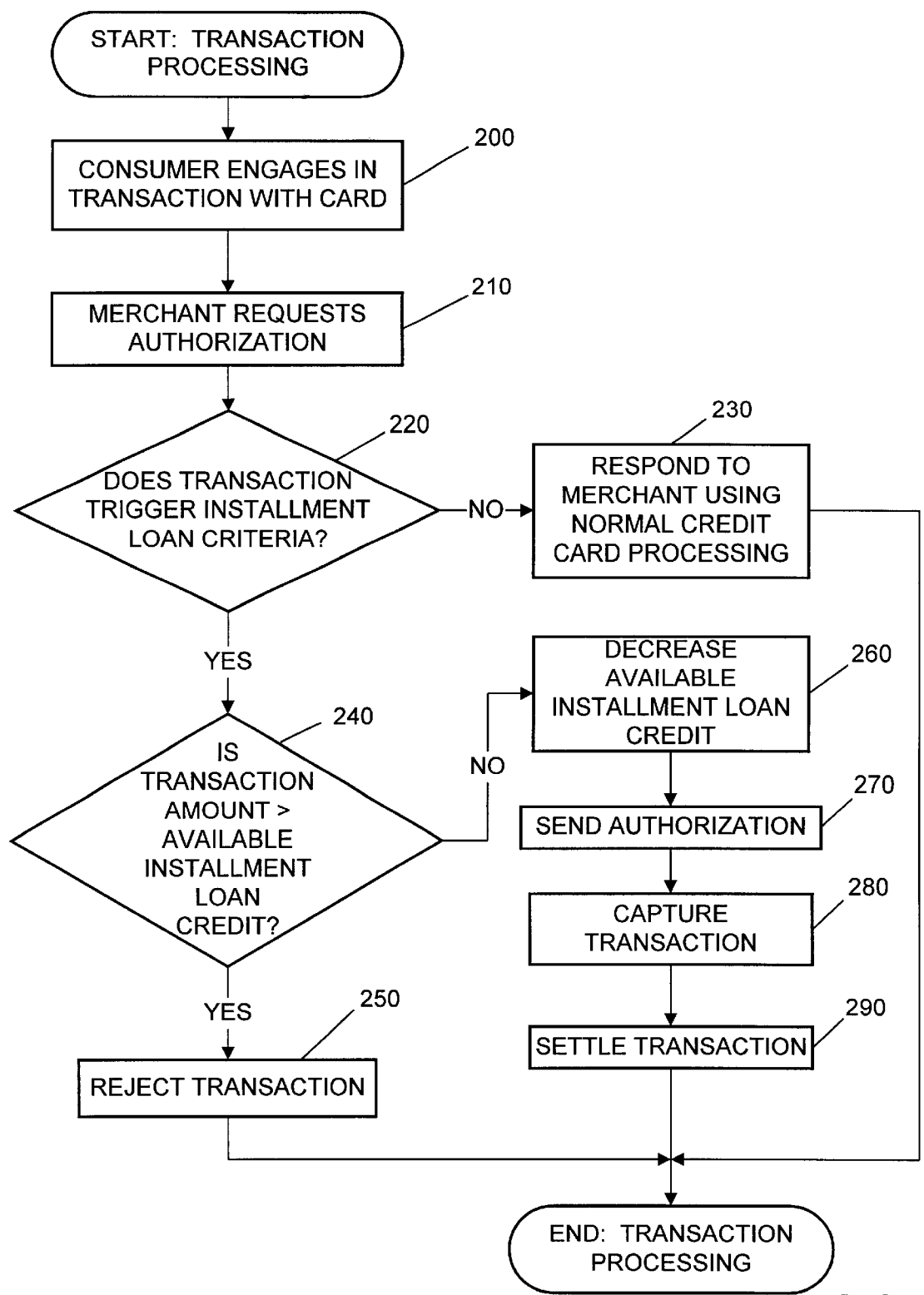
FIG. 2 is a flowchart illustrating the steps for processing a transaction in a financial transaction card system with an installment loan feature according to a preferred embodiment of the present invention.

FIG. 2 is a flowchart illustrating the steps for processing a transaction in a financial transaction card system with an installment loan feature according to a preferred embodiment of the present invention. In step 200, a cardholder engages in a transaction with a credit card having the installment loan feature. In step 210, the merchant engaged in the transaction requests authorization for the transaction from the merchant bank or its agent. The merchant bank or its agent communicates the, request to the interchange or the issuing financial institution or its agent.

In step 220, the interchange or the financial institution or its agent determines whether the transaction t riggers one or more of the criteria for installment loan processing specified for the credit card account of the cardholder In step 230, if the transaction does not trigger any of the criteria for installment loan processing, normal credit card processing is performed—i.e., the financial institution or its agent accepts or rejects the transaction based on at least a determination of whether the transaction would exceed the credit line of the credit card account. If one or more of the criteria for installment loan processing is triggered, in step 240 the interchange or the financial institution or its agent determines whether the transaction amount is greater than the available installment loan credit amount, which is equal to the installment loan credit limit minus the total installment loans balances due for the credit card account. If the transaction amount exceeds the available installment loan credit amount, the transaction is rejected in step 250. Alternatively, if the transaction amount exceeds the available installment loan credit amount, the transaction may be accepted or rejected under normal credit card processing procedures. If the transaction amount does not exceed the available installment loan amount, in steps 260 and 270, the available installment loan credit amount is decreased by the transaction amount and the transaction is accepted by sending an authorization code to the merchant.

It is should be noted that in steps 260 and 270, the authorization reduces the available credit amount but preferably does not actually put a charge on the cardholder's account. It is preferred that a cardholder's account is not charged during authorization because bankcard associations, such as MasterCard International Incorporated®, have promulgated rules that do not allow a merchant to charge or capture a transaction until goods are shipped or services are delivered. Thus, it is preferable for the charging or capturing process to be performed separately in step 280. After the charging or capturing step, settlement occurs in step 290. As explained above, transactions are usually captured and accumulated into a "batch," which are then settled as a group.

Figure 3A:
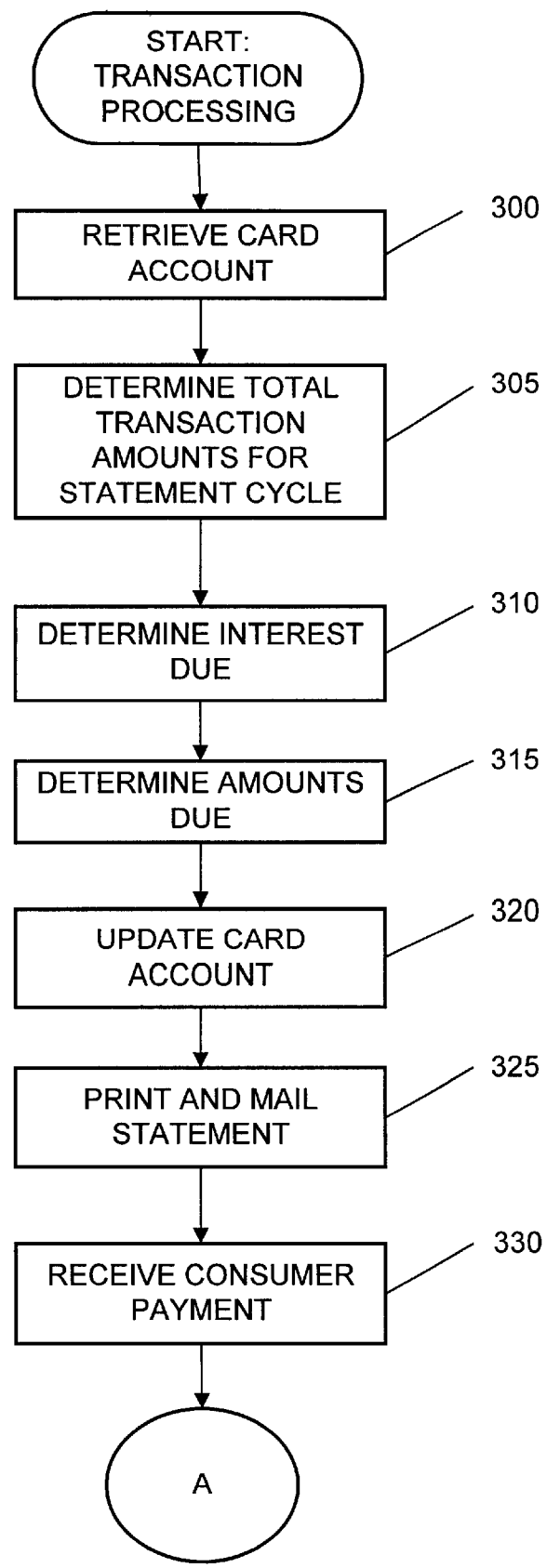
FIGS. 3A and 3B are flowcharts illustrating the steps for processing a statement in a financial transaction card system with an installment loan feature according to a preferred embodiment of the present invention.
Figure 3B:
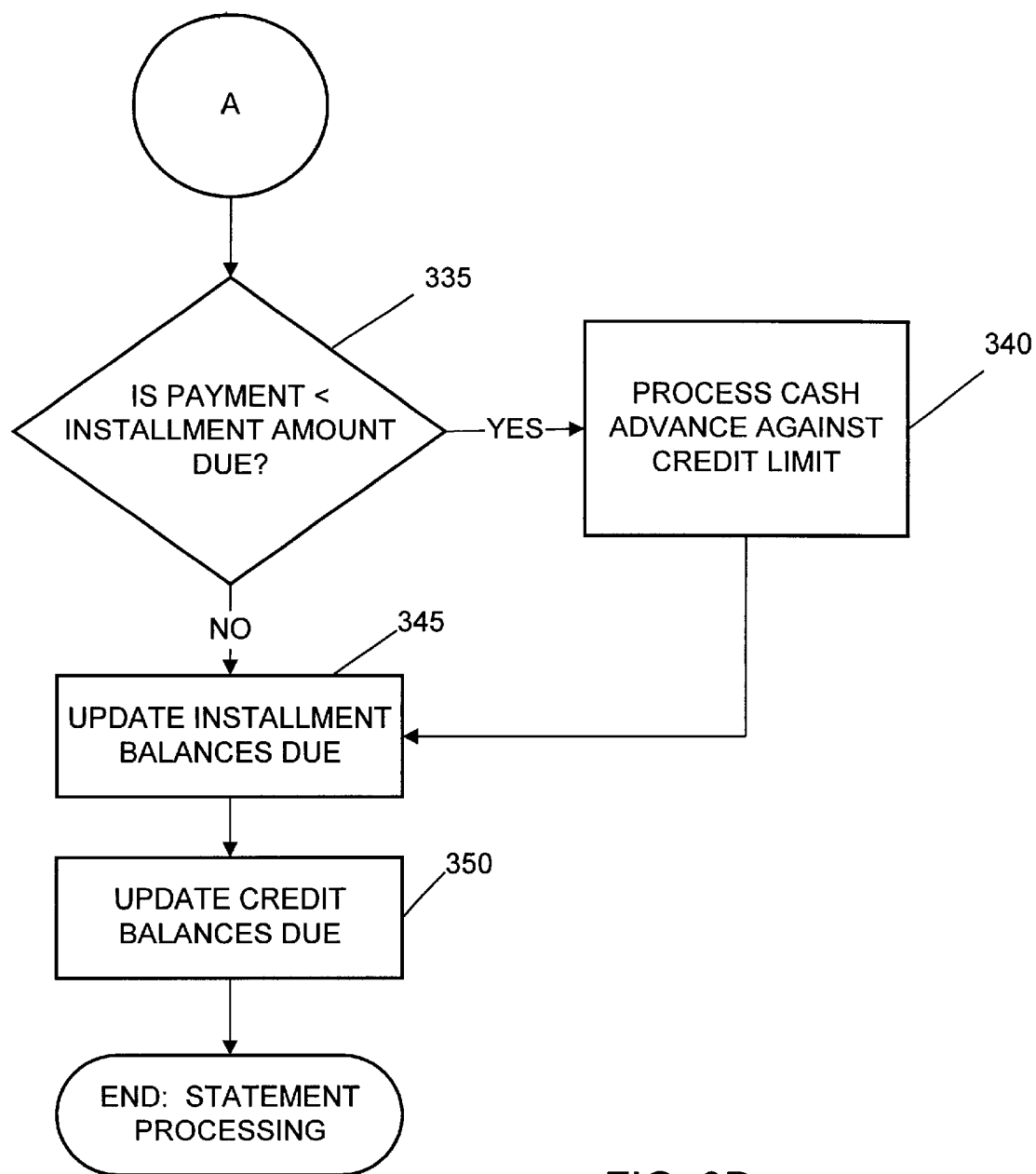

FIGS. 3A and 3B are flowcharts illustrating the steps for processing a statement for a financial transaction card with an installment loan feature according to a preferred embodiment of the present invention. The statements are typically processed on a monthly basis. In step 300, the card account record is retrieved from the financial institution's database. In step 305, the transactions that have been captured for the card account, both on a credit and on an installment loan basis, are totaled. In step 310, the interest due on previously unpaid credit balances and on new installment loans is calculated. In steps 315 and 320, the new amounts due on both credit and installment loan activities are calculated and the card account record is updated.

In step 325, the statement is printed and mailed. FIGS. 4A and 4B illustrate a preferred embodiment of a statement produced by a financial transaction card system according to the present invention. As shown, the statement lists a summary of the credit and the installment loan activities on the first page. The statement lists a detailed description of the credit and the installment loan activities on the first and second pages, respectively. As shown in FIG. 4B, for each loan, the detailed description of the installment loan activity preferably includes the date of the loan, the description of the loan, the loan amount, the total number of installment payments due, the current installment payment number, the current installment payment amount due, and the total installment loan balance due. In addition, it is also preferred that the installment loan terms are listed on the same page as the detailed description of the installment loan activity to remind the cardholder of these terms.

Returning to FIG. 3A, in step 330, after mailing the statement, a payment is 5 received from the cardholder. Referring to FIG. 3B, in step 335, it is determined whether the payment received is less than the installment loan amount due. If the payment is less than the installment loan amount due, a cash advance in the amount of the difference between the payment received and the installment loan amount due is preferably charged against the cardholder's credit line in step 340. Alternatively, payment collection procedures may be implemented in this step.

If a sufficient payment is received in step 335 or a deficiency is processed in step 340, in step 345 the installment loan balances are updated to reflect the payment. In step 350, any payment amount received above the installment loan amount due is applied against the credit balances due. In steps 345 and 350, the card account record is updated accordingly.

Although the present invention has been described with reference to certain preferred embodiments, various modifications, alterations, and substitutions will be known or obvious to those skilled in the art without departing from the spirit and scope of the invention, as defined by the appended claims.

I claim:

1. In a financial transaction payment system having a processing unit, an application being executed thereon, and a memory unit coupled to said processing unit, a method of setting up an account associated with a financial transaction card of a consumer to enable said consumer to activate one or more installment loans with said financial transaction card for the payment of one or more transactions said method comprising the steps of:

storing by said application program in said memory unit a credit limit for said one or more installment loans that may be activated with said financial transaction card; and storing by said application program in said memory unit one or more activation criteria for said one or more installment loans that may be activated with said financial transaction card, wherein at least one criterion of said one or more activation criteria is associated with a type of a transaction.

2. In a financial transaction payment system having a processing unit, an application being executed thereon, and a memory unit coupled to said processing unit, a method of setting up an account associated with a financial transaction card of a consumer to enable said consumer to activate one or more installment loans with said financial transaction card for the payment of one or more transactions, said method comprising the steps of:

storing by said application program in said memory unit a credit limit for said one or more installment loans that may be activated with said financial transaction card; and storing by said application program in said memory unit one or more activation criteria for said one or more installment loans that may be activated with said financial transaction card, wherein at least one criterion of said one or more activation criteria is associated with the amount of a transaction.

3. In a financial transaction payment system having a processing unit, an application being executed thereon, and a memory unit coupled to said processing unit, a method of setting up an account associated with a financial transaction card of a consumer to enable said consumer to activate one or more installment loans with said financial transaction card for the payment of one or more transactions, said method comprising the steps of:

storing by said application program in said memory unit a credit limit for said one or more installment loans that may be activated with said financial transaction card; and storing by said application program in said memory unit one or more activation criteria for said one or more installment loans that may be activated with said financial transaction card, wherein at least one criterion of said one or more activation criteria is associated with a merchant classification code associated with a merchant involved in a transaction.

4. A financial transaction payment system for setting up an account associated with a financial transaction card of a consumer to enable said consumer to activate one or more installment loans with said financial transaction card for the payment of one or more transactions, comprising:

a processing unit;

an application for execution on said processing unit;

a memory unit coupled to said processing unit;

means for storing by said application pro ram in said memory unit a credit limit for one or more installment loans that may be activated with said financial transaction card; and means for storing by said application program in said memory unit one or more activation criteria for said one or more installment loans that may be activated with said financial transaction card, wherein at least one criterion of said one or more activation criteria is associated with a type of a transaction.

5. A financial transaction payment system for setting up an account associated with a financial transaction card of a consumer to enable said consumer to activate one or more installment loans with said financial transaction card for the payment of one or more transactions, comprising:

a processing unit, an application for execution on said processing unit;

a memory unit coupled to said processing unit;

means for storing by said application program in said memory unit a credit limit for one or more installment loans that may be activated with said financial transaction card; and means for storing by said application program in said memory unit one or more activation criteria for said one or more installment loans that may be activated with said financial transaction card, wherein at least one criterion of said one or more activation criteria is associated with the amount of a transaction.

6. A financial transaction payment system for setting up an account associated with a financial transaction card of a consumer to enable said consumer to activate one or more installment loans with said financial transaction card for the payment of one or more transactions, comprising:

a processing unit;

an application for execution on said processing unit;

a memory unit coupled to said processing unit;

means for storing by said application program in said memory unit a credit limit for one or more installment loans that may be activated with said financial transaction card; and means for storing by said application program in said memory unit one or more activation criteria for said one or more installment loans that may be activated with said financial transaction card, wherein at least one criterion of said one or more activation criteria is associated with a merchant classification code associated with a merchant involved in a transaction.

* * * * *

UNITED STATES PATENT AND TRADEMARK OFFICE
CERTIFICATE OF CORRECTION

PATENT NO. : 6,315,193 B1
DATED : November 13, 2001
INVENTOR(S) : Edward J Hogan It is certified that error appears in the above-identified patent and that said Letters Patent is hereby corrected as shown below:

Column 2,
Line 66, "the at" should read -- that --

Column 3,
Line 24, "Thorn" should read -- the --

Column 6,
Line 5, "This" should read -- These --; and "triggers" should read -- trigger --
Line 31, "the, request" should read -- the request --
Line 34, "t riggers" should read -- triggers --
Line 36, "cardholder In" should read -- cardholder. In --

Column 7,
Line 36, "5" should be deleted
Line 66, "transaction said" should read -- transaction, said --

Column 8,
Line 57, "pro ram" should read -- program --

Signed and Sealed this

Tenth Day of June, 2003

JAMES E. ROGAN
*Director of the United States Patent and Trademark Office*